United States Patent [19]
Okano

[11] Patent Number: 5,081,587
[45] Date of Patent: Jan. 14, 1992

[54] CONTROL SYSTEM FOR ACTUATING VEHICLE SAFETY DEVICES

[75] Inventor: Masami Okano, Higashimatsuyama, Japan

[73] Assignee: Diesel Kiki Co., Ltd., Japan

[21] Appl. No.: 503,978

[22] Filed: Apr. 4, 1990

[30] Foreign Application Priority Data

Apr. 12, 1989 [JP] Japan .................................. 1-90773

[51] Int. Cl.$^5$ .............................................. B60R 22/40
[52] U.S. Cl. .................................. 364/424.05; 280/735
[58] Field of Search ................. 364/424.01, 424.05; 280/734, 735

[56] References Cited

U.S. PATENT DOCUMENTS

| | | | |
|---|---|---|---|
| 3,911,391 | 10/1975 | Held et al. | 180/103 |
| 4,497,025 | 1/1985 | Hannoyer | 364/424.05 |
| 4,638,179 | 1/1987 | Mattes et al. | 280/735 |
| 4,836,024 | 6/1989 | Woehrl et al. | 73/514 |
| 4,958,851 | 9/1990 | Behr et al. | 280/735 |
| 4,968,965 | 11/1990 | Naitou et al. | 340/436 |
| 4,984,464 | 1/1991 | Thomas et al. | 73/517 R |
| 4,984,651 | 1/1991 | Grösch et al. | 180/268 |
| 4,985,835 | 1/1991 | Sterler et al. | 364/424.05 |
| 4,994,972 | 2/1991 | Diller | 364/424.05 |
| 5,040,118 | 8/1991 | Diller | 364/424.05 |

FOREIGN PATENT DOCUMENTS 4955031 5/1974 Japan .

OTHER PUBLICATIONS

PCT International Publication No. WO 88/00146 English Abstract from World Patent Index, published Jan. 14, 1988.

Primary Examiner—Thomas G. Black
Attorney, Agent, or Firm—Pollock, Vande Sande & Priddy

[57] ABSTRACT

In a control system for actuating vehicle safety devices, data representing change in the detected vehicle speed is calculated on the basis of the acceleration sensed by a vehicle acceleration sensor. The data is compared with a reference signal depending upon the vehicle running speed to discriminate whether or not the change in the detected vehicle speed has reached a level determined by the reference signal, whereby the occurrence collision can be detected reliably and without erroneous detection over a wide range of vehicle running speeds.

15 Claims, 3 Drawing Sheets

CONTROL SYSTEM FOR ACTUATING VEHICLE SAFETY DEVICES

BACKGROUND OF THE INVENTION

1. Field of the Invention

The present invention relates to a control system for actuating vehicle safety devices such as an air-bag, a safety belt tightening device and the like in a motor vehicle.

2. Description of the Prior Art

For ensuring the safety of motor vehicle passengers, there have been developed various vehicle safety devices such as the air-bag, the safety belt tightening device and the like. For these devices to work effectively, it is necessary to detect when a collision has occurred as soon as possible, and to actuate the safety device reliably when a collision has occurred. On the other hand, it should be ensured the safety device will not be actuated owing to an erroneous detecting or discriminating operation.

Various control systems for actuating vehicle safety devices have been proposed for meeting these requirements. For example, U.S. Pat. No. 3,911,391 discloses a control device in which the output from an acceleration sensor is integrated when the output level of the acceleration sensor exceeds a predetermined level to obtain information concerning the vehicle speed thereafter and it is determined that the vehicle has collided with an obstruction when the decrease in the vehicle speed reaches a prescribed level. Thus, in the disclosed control device, the operation necessary for ensuring the safety of the operator and passengers of the motor vehicle is actuated when a sudden decrease in the vehicle speed has occurred.

However, in the case of a vehicle with a crushable structure in which the impact incurred at the time of a collision can be absorbed to soften the impact, the impact is absorbed during the initial period of the collision. As a result, the output of an acceleration sensor located in the passenger compartment is likely to be small just after a collision has occurred, and the acceleration sensor produces a large output only later, after sudden acceleration or deceleration of the vehicle body occurs Therefore, in such a case, if it is determined that the vehicle has collided with an obstruction at the time the output level of the acceleration sensor reaches a predetermined level, the safety device may be actuated with a relatively large delay time. As a result, the movement speed of the body of the driver or passengers per unit time has already become large and the quick displacement of the head of the car occupants may have already started. Accordingly, when the safety device is actuated it is very difficult to keep the displacement of the head within a predetermined range which is required for ensuring the safety of the car occupants. To overcome this problem, if the prescribed level described above is lowered, it is liable to cause an erroneous discrimination and the reliability of the control device will be degraded Furthermore, in the prior art there has been proposed a control system in which a switch type sensor is placed at the forward and central portion of the vehicle in order to detect vehicle collision as soon as possible. However, the reliability of the sensor of this type is not sufficient and the sensor or the wiring therefor will be destroyed when the vehicle collides with an obstruction.

SUMMARY OF THE INVENTION

It is an object of the present invention to provide an improved control system for actuating vehicle safety devices.

It is another object of the present invention to provide a control system for actuating vehicle safety devices which is capable of reliably detecting the occurrence of a collision within the period of time required for ensuring the protection of the vehicle occupants.

It is a further object of the present invention to provide a control system for actuating vehicle safety devices with high reliability.

According to the present invention, in a control system for actuating vehicle safety devices, such as an air-bag, a safety belt tightening device and the like in a motor vehicle, the system comprises a first means which includes an acceleration sensor for sensing the acceleration of the vehicle and produces data representing change in the detected speed of the vehicle obtained based on the acceleration sensed by the acceleration sensor, a second means for detecting the running speed of the vehicle, and a discriminating means responsive to the first and second means for discriminating whether or not a collision has occurred on the basis of the change in the detected speed of the vehicle taking into account the running speed of the vehicle. The discriminating means may include a setting means responsive to the second means for setting a reference level in relation to the running speed of the vehicle, and a comparing means for comparing the level of the detected speed of the vehicle represented by the data with the reference level to discriminate whether or not a collision has occurred.

The acceleration of the vehicle at the time the collision is detected by the acceleration sensor and the data representing the change in the detected vehicle speed is obtained based on the acceleration detected by the acceleration sensor. On the other hand, the running speed of the vehicle is detected by the second means, and the discrimination is made by the discriminating means as to whether or not the change in the magnitude of the detected vehicle speed obtained by the first means exceeds the reference level determined in accordance with the running speed of the vehicle for determining whether or not collision has occurred Thus, the discrimination of the occurrence of collision can be appropriately carried out with reference to a reference level properly determined in accordance with the running speed at each instant.

The invention will be better understood and other objects and advantages thereof will be more apparent from the following detailed description of preferred embodiments with reference to the accompanying drawings.

DESCRIPTION OF THE PREFERRED EMBODIMENT

Figure 1:
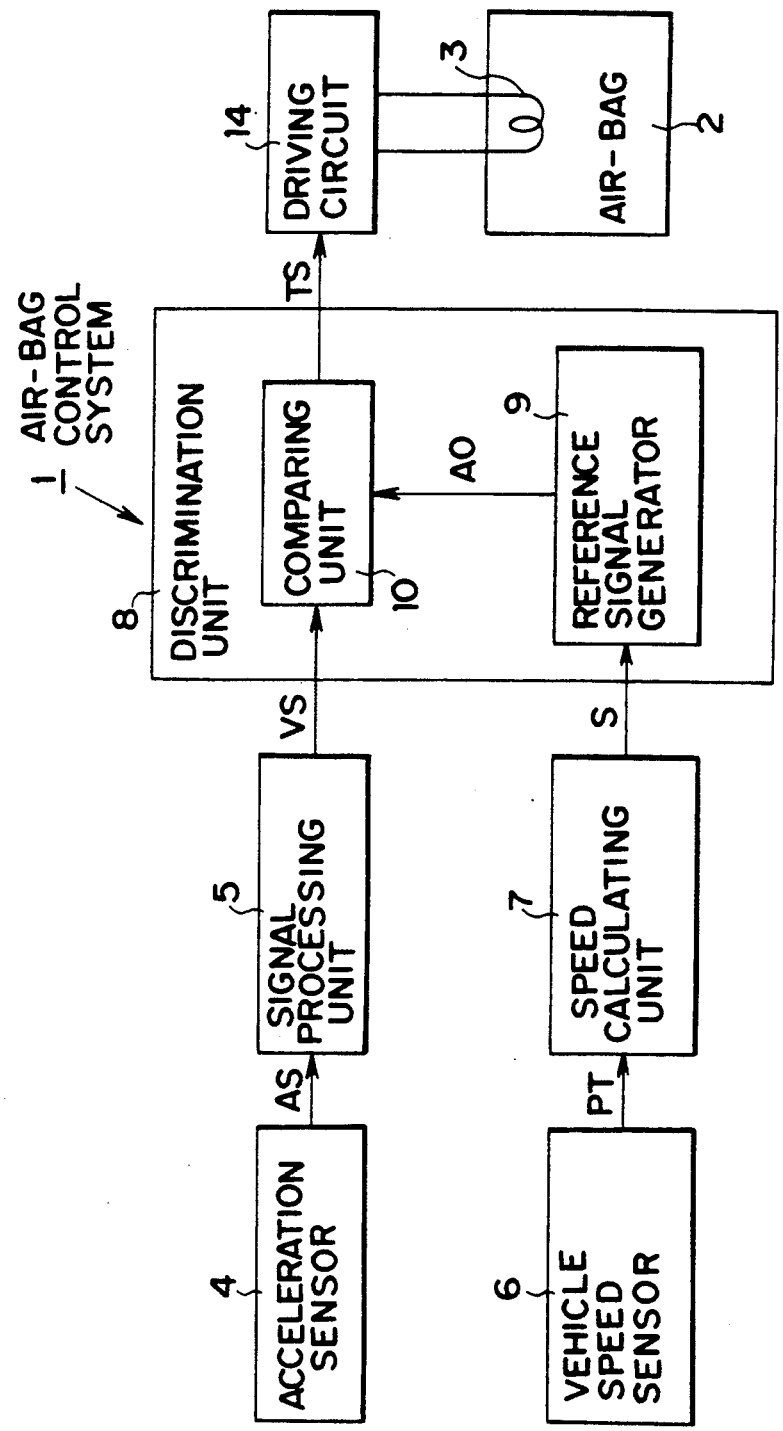
FIG. 1 is a block diagram showing an embodiment of a control system for actuating an air-bag according to the present invention.

In FIG. 1, there is shown an air-bag control system for controlling the actuation of an air bag for vehicles in accordance with the present invention. An air-bag control system 1 is for controlling the actuating current for an electrically fired actuator 3 provided in an air-bag 2 mounted on a vehicle (not shown), and has an acceleration sensor 4 for sensing the acceleration of the vehicle, which may be the conventional semiconductor type vehicle acceleration sensor of well-known design for detecting the magnitude of the positive/negative change in the speed of a vehicle per unit time as an acceleration. The acceleration sensor 4 is mounted at, for example, an appropriate place in the engine compartment and an output signal AS showing the acceleration acting on the vehicle body is produced thereby.

The output signal AS is supplied to a signal processing unit 5 where it is amplified. In the signal processing unit 5 discrimination is made as to whether or not the acceleration shown by the output signal AS is in a predetermined range falling outside the range of the acceleration occurring in normal operation of the vehicle and within the rage of acceleration occurring during collision. After the acceleration shown by the output signal AS has once entered the predetermined range, the output signal AS produced thereafter is integrated and the signal processing unit 5 produces a detected speed signal VS indicating the change in the vehicle speed after the acceleration at a level never incurred in normal operation is detected.

Figure 2:
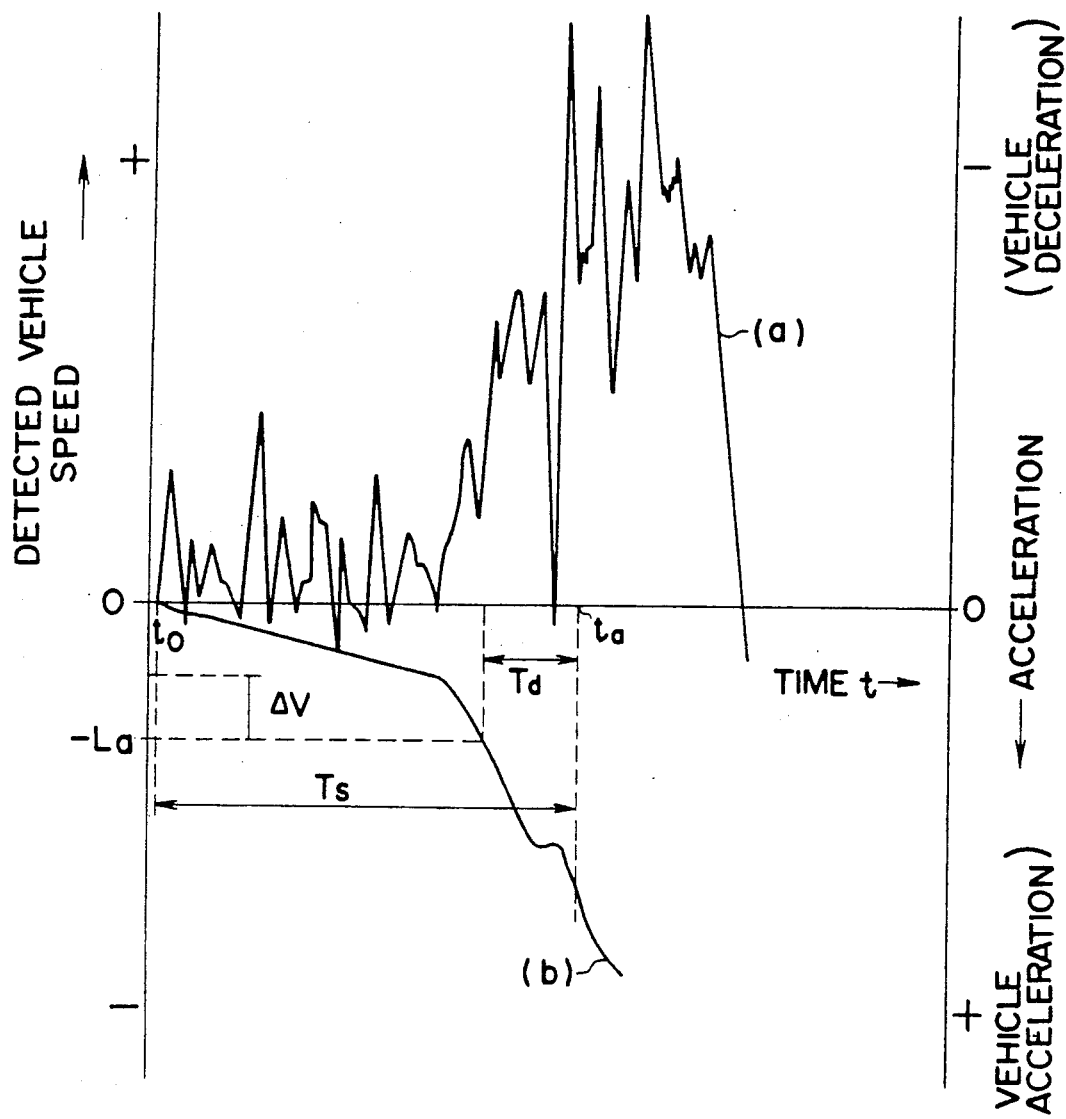
FIG. 2 is a graph showing an example of the changes in the acceleration of a vehicle and the corresponding detected vehicle speed in a collision, for explaining the operation of the control system shown in FIG. 1.

FIG. 2 is a graph showing an example of the change in the acceleration of a vehicle detected by the acceleration sensor 4 in the case where the vehicle collides with a forward obstruction. In this graph, time t is plotted along the abscissas and the curve (a) shows the change in the acceleration of the vehicle. Furthermore, the curve (a) starts at $t = t_0$ where the the vehicle acceleration shown by the output signal AS has entered the predetermined range, and the integration operation for the output signal AS starts in the signal processing unit 5 after $t_0$. In FIG. 2, the detected vehicle speed shown by the detected speed signal VS, which is obtained by integrating the output signal AS as described above, is shown by the curve (b).

Returning to FIG. 1, the system 1 is provided with a vehicle speed sensor 6, which is a well-known speed sensor for detecting the rotational speed of the propeller shaft and produces a pulse train signal PT whose frequency depends upon the rotational speed of the propeller shaft. The pulse train signal PT is applied to a speed calculating unit 7, in which the period of the pulse train signal PT is measured and the vehicle running speed is calculated on the basis of the resulting period. A running speed signal S indicating the calculated vehicle running speed is output from the speed calculating unit 7 and supplied to a discrimination unit 8 to which the detected speed signal VS is also supplied. The discrimination unit 8 is composed of a reference signal generator 9 and a comparing unit 10, and serves to discriminate whether or not collision has occurred in the vehicle in response to the detected speed signal VS and the running speed signal S.

Figure 3:
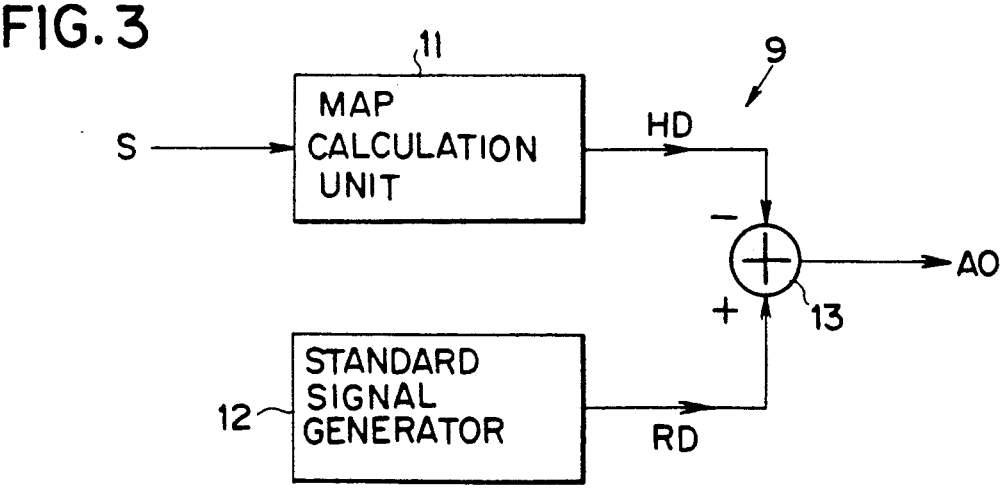
FIG. 3 is a detailed block diagram of the reference signal generator shown is FIG. 1.

As illustrated in FIG. 3, the reference signal generator 9 comprises a map calculation unit 11 in which the map calculation is carried out in response to the running speed signal S in accordance with map data corresponding to characteristics showing the relationship between the vehicle running speed and correction values, and the correction value corresponding to the vehicle running speed indicated by the running speed signal S at each instant is determined by the map calculation in the map calculation unit 11. Then, a correction signal HD representing the calculated correction value is output from the map calculation unit 11. The reference signal generator 9 further comprises a standard signal generator 12 which produces a standard signal RD representing a standard level, and the correction signal HD is added to the standard signal RD by an adding unit 13 in the polarity shown in FIG. 3 to produce a reference signal AO. The reference signal AO is applied to the comparing unit 10 for discriminating whether or not a collision has occurred in the vehicle on the basis of the level of the detected speed signal VS.

Returning to FIG. 1, the detected speed signal VS is applied to the comparing unit 10 to compare the level of the detected speed signal VS with that of the reference signal AO. As explained in the foregoing, the reference signal AO is indicative of the reference level which is used for determining whether or not a collision has occurred in the vehicle on the basis of the detected speed signal VS, and the reference level described above is usually determined as follows.

In order to complete the necessary operation of the air-bag 2 before the displacement of the head of the occupant(s) due to a collision has reached a predetermined allowable maximum distance, that is, 10 to 15 centimeters, required for ensuring their protection, assuming that the delay time from the time of the production of an air-bag triggering signal to the complete inflation of the air-bag 2 is $t_d$ and the head of the occupant(s) is displaced by the predetermined allowable maximum distance at $t_a$, that is, after the passage of time $t_s$ from the occurrence of the collision, the level of the detected vehicle speed at the passage of time $t_a-t_d$ from the time of the collision is determined at $t_0$ as the standard level $-L_a$ (see FIG. 2).

Figure 4:
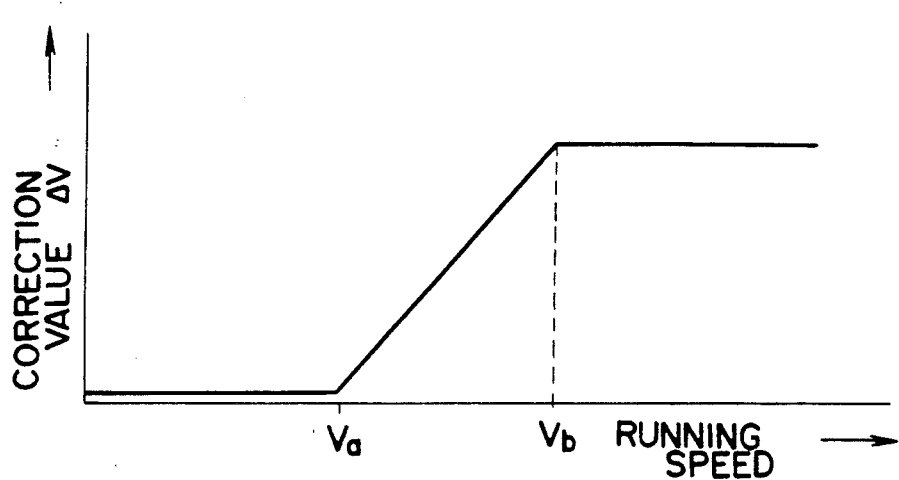
FIG. 4 is a graph showing the relationship between the vehicle running speed and a correction value used in the discrimination unit.

Consequently, in the case where the vehicle running speed is lower than Va, the reference level indicated by the reference signal AO is equal to $-L_a$ because the correction value is zero. In this case, the comparing unit 10 is operated to produce a trigger signal TS when the level of the detected vehicle speed indicated by the detected speed signal VS becomes less than $-L_a$. As will be understood from the graph shown in FIG. 4, the correction value varies in proportion to the vehicle running speed when the running speed is between $V_a$ and $V_b$. As a result, the level of the reference signal AO becomes greater as the vehicle running speed increases, so that early determination of the collision is made. If the vehicle running speed is greater than V, the correction value is fixed at a predetermined constant valve which is not equal to zero. The characteristic curve shown in FIG. 4 is only one example, and, of course, any characteristic curves different from that shown in FIG. 4 can be alternatively selected.

In any case, when the level of the detected vehicle speed as indicated by the detected speed signal VS becomes smaller than the reference level indicated by the reference signal AO, the air-bag triggering signal TS is generated from the discrimination unit 8 and applied to a driving circuit 14. The driving circuit 14 is responsive to the air-bag triggering signal TS and provides a firing current to the electrically fired actuator 3 to operate the air-bag 2.

With this constitution, the detected speed signal VS produced by the signal processing unit 5 is compared with the reference signal AO produced by the reference signal generator 9. When the level of the detected vehicle speed decreases due to a vehicle collision and has become less than the reference level, the air-bag 2 is actuated. In the control system according to the present invention, since the reference level is varied in accordance with the vehicle running speed as described above, a larger change in the magnitude of the detected vehicle speed is required to trigger the air-bag 2 during the relatively low speed running of the vehicle, while a smaller change in the magnitude of the detected vehicle speed suffices as the vehicle running speed becomes higher.

Accordingly, a larger impact is needed to trigger the air-bag 2 in the case where the vehicle is running at a relatively low speed, and the impact necessary for triggering the air-bag 2 becomes less as the vehicle running speed increases. This means that, in the case where an impact is applied to the vehicle, the triggering signal TS is produced earlier during high speed running of the vehicle than during the low speed running of the vehicle. As a result, the control system 1 is able to effectively avoid triggering the air-bag 2 erroneously when the vehicle is running at a relatively low speed, while the control system 1 is capable of early collision detection when the vehicle is running at a relatively high speed, whereby ideal control operation can be realized.

Figure 5:
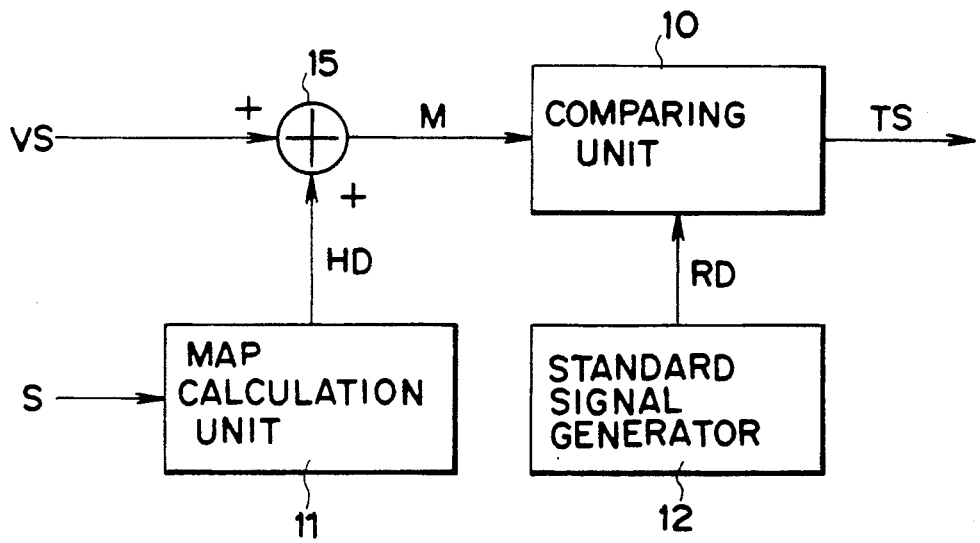
FIG. 5 is a detailed block diagram showing a modified arrangement of the discrimination unit of FIG. 3.

The arrangement of the discrimination unit 8 shown by FIGS. 1 and 3 is one embodiment and the discrimination unit 8 can be alternatively arranged, for example, as shown in FIG. 5. In FIG. 5, the comparing unit 10, the map calculation unit 11 and the standard signal generator 12 are the same as those shown in FIGS. 1 and 3. The arrangement of FIG. 5 is different from that shown by FIGS. 1 and 3 in that the level of the detected speed signal VS is corrected in accordance with the correction signal HD by an adding unit 15 to produce corrected speed signal M, and the discrimination of the occurrence of the vehicle collision is made by comparing the corrected speed signal M with the standard signal RD. However, the operations performed are substantially the identical in the two cases and the same effect will be obtained in either case.

I claim:

1. A control system for actuating a vehicle safety device in a motor vehicle, said system comprising:
   an acceleration sensor for producing an output signal representing acceleration of the vehicle;
   processing means for producing change data representing change in the detected vehicle speed calculated on the basis of the output signal produced by said acceleration sensor;
   detecting means for detecting the running speed of the vehicle;
   generating means for generating a reference signal;
   discriminating means responsive to said processing means and said detecting means for discriminating whether or not a collision of the vehicle has occurred by comparing the change data with the reference signal in order to indicate whether or not the change in the detected vehicle speed has reached a magnitude relative to a reference level of the reference signal, said discriminating means including means for making said comparison in such a way that as the running speed of the vehicle increases, a smaller change in the detected vehicle speed produces an indication that collision of the vehicle has occurred; and,
   actuating means responsive to said discriminating means for activating said vehicle safety device.

2. A control system as claimed in claim 1, wherein the change data is obtained by integrating the output signal after the acceleration indicated by the output signal exceeds a predetermined level which is never incurred in the normal running condition of the vehicle.

3. A control system as claimed in claim 1, wherein said discriminating means has a generating means responsive to the output of said detecting means for generating the reference signal and a comparing means for comparing the change data with the reference signal in order to discriminate whether or not the change in the detected vehicle speed has reached the reference level according to the reference signal.

4. A control system as claimed in claim 3, wherein the reference signal is determined in accordance with the running speed of the vehicle in such a way that the reference level according to the reference signal becomes greater as the running speed of the vehicle increases.

5. A control system as claimed in claim 3, wherein said generating means has a signal generator for generating a standard signal, a determination means responsive to the output of said detecting means for determining a correction value corresponding to the running speed of the vehicle, and means for correcting the standard signal by the correction value to produce the reference signal.

6. A control system as claimed in claim 5, wherein the correction value is determined on the basis of a predetermined characteristic curve representing the relationship between the correction value and the vehicle running speed.

7. A control system as claimed in claim 6, wherein the correction value is determined by a map calculation based on map data corresponding to the predetermined characteristic curve.

8. A control system as claimed in claim 6, wherein the correction value increases as the the vehicle running speed increases for a medium range of the vehicle running speed.

9. A control system as claimed in claim 5, wherein the reference level according to the reference signal becomes greater as the the running speed of the vehicle increases at least within a part of the range of the vehicle running speed.

10. A control system as claimed in claim 1, wherein said reference signal is a standard signal; and wherein said discriminating means comprises determination means responsive to the output of said detecting means for determining a correction value corresponding to the running speed of the vehicle, means for correcting the change data on the basis of the correction value to produce a corrected speed signal, and comparing means for comparing the corrected speed signal with the standard signal in order to discriminate whether or not a level of the corrected speed signal has reached the reference level according to the standard signal.

11. A control system for actuating a vehicle safety device in a motor vehicle, said system comprising:
an acceleration sensor for producing an output signal representing acceleration of the vehicle;
processing means for producing data representing change in the detected vehicle speed calculated on the basis of the acceleration sensed by said acceleration sensor;
detecting means for detecting the running speed of the vehicle;
generating means responsive to the output of said detecting means for generating a reference signal which is determined to accordance with the running speed of the vehicle in such a way that the level according to the reference signal becomes greater as the running speed of the vehicle increases;
comparing means for comparing the data with the reference signal in order to discriminate whether or not the change in the detected vehicle speed has reached the level according to the reference signal; and
actuating means responsive to said comparing means for activating said vehicle safety device.

12. A control system as claimed in claim 11, wherein said generating means comprises a signal generator for generating a standard signal, determination means responsive to the output of said detecting means for determining a correction value corresponding to the running speed of the vehicle, and means for correcting the standard signal by the correction value to produce the reference signal.

13. A control system as claimed in claim 12, wherein the correction value is determined on the basis of a predetermined characteristic curve representing the relationship between the correction value and the vehicle running speed.

14. A control system as claimed in claim 13, wherein the correction value is determined by a map calculation based on map data corresponding to the predetermined characteristic curve.

15. A control system for actuating a vehicle safety device in a motor vehicle, said system comprising:
an acceleration sensor for producing an output signal representing acceleration of the vehicle;
processing means for producing change data representing change in the detected vehicle speed calculated on the basis of the acceleration sensed by said acceleration sensor;
means for generating a standard signal;
detecting means for detecting the running speed of the vehicle;
determination means responsive to the output of said detecting means for determining a correction value corresponding to the running speed of the vehicle;
means for correcting the change data on the basis of the correction value to produce corrected speed data in such a way that a level of the corrected speed data becomes smaller as the running speed of the vehicle increases; and,
comparing means for comparing the corrected speed data with the standard signal in order to discriminate whether or not the level of the corrected speed data has reached a reference level according to the standard signal.

* * * * *

UNITED STATES PATENT AND TRADEMARK OFFICE
CERTIFICATE OF CORRECTION

PATENT NO. : 5,081,587
DATED : January 14, 1992
INVENTOR(S) : Masami Okano

It is certified that error appears in the above-identified patent and that said Letters Patent is hereby corrected as shown below:

Column 7, line 13, change "to" to --in--.

Signed and Sealed this

Sixth Day of April, 1993

Attest:

STEPHEN G. KUNIN

*Attesting Officer*     *Acting Commissioner of Patents and Trademarks*